Figure 1:
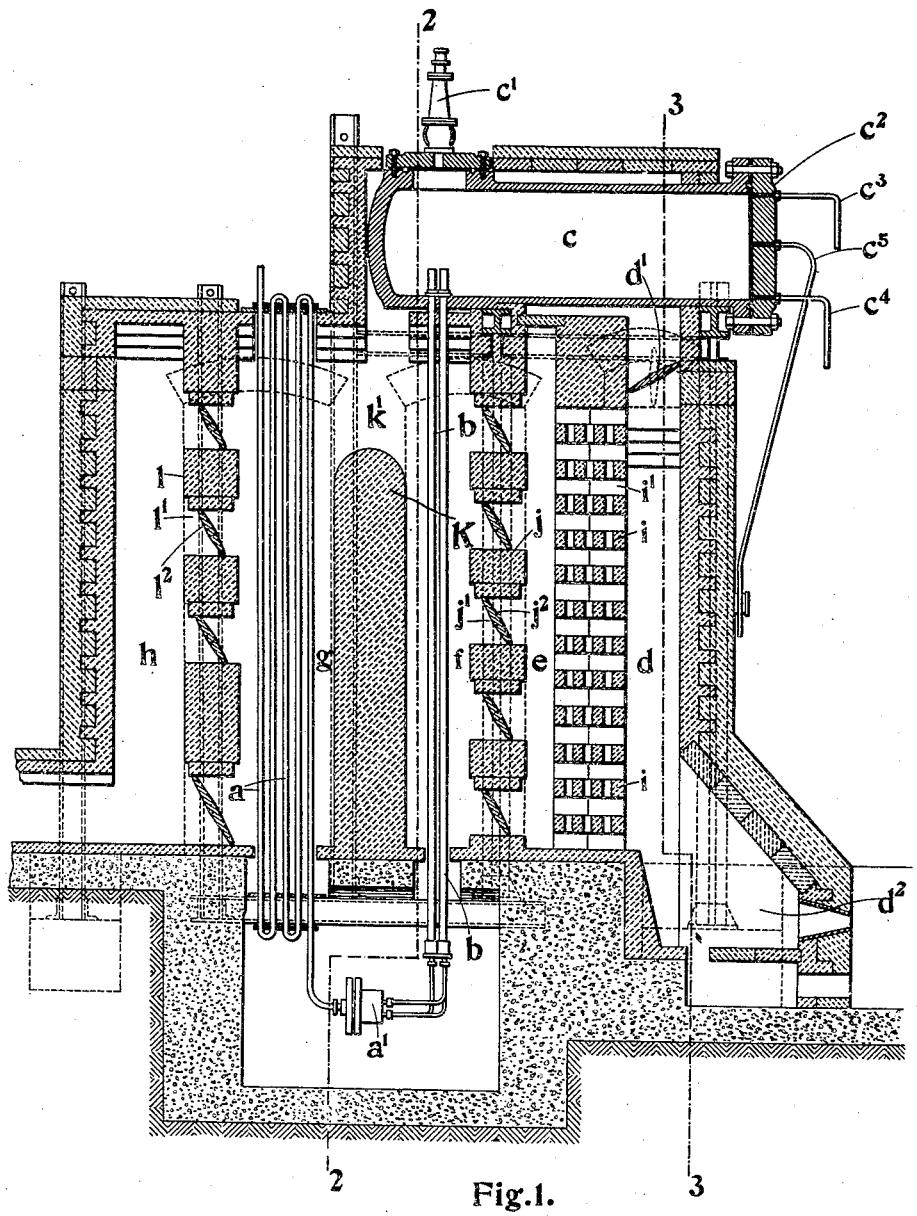

Patented Mar. 24, 1931

1,798,054

UNITED STATES PATENT OFFICE

SAMUEL JAMES MANSON AULD, ALBERT ERNEST DUNSTAN, AND PERCY HENRY HERRING, OF SUNBURY-ON-THAMES, ENGLAND, ASSIGNOR TO ANGLO-PERSIAN OIL COMPANY, LIMITED, OF LONDON, ENGLAND

TREATMENT OF LIQUID HYDROCARBONS

Application filed February 11, 1924, Serial No. 692,062, and in Great Britain February 20, 1923.

This invention relates to the treatment of liquid hydrocarbons, and while of general application in the treatment of heavy petroleum and other liquid hydrocarbons for the production therefrom of lighter bodies, is of especial utility in the treatment of heavy asphaltic residues, to obtain from them a proportion of light spirit, and to render the ultimate residue after treatment, and after removal of the light spirit, less viscous and thus more useful as a fuel oil than before.

The invention relates to a known single cycle type of pressure cracking process carried out in the liquid phase, in which the liquid is first pre-heated, and is then passed through heating or thermalizing tubes, in which it is subjected to the necessary degree of heat for cracking, before issuing into a closed vessel or reactor of relatively large area, where the liquid is maintained under pressure for a determined time for the cracking to be completed or effected.

The invention has among its objects to avoid secondary reactions in the vapour phase, to reduce the amount of uncondensable gas, to secure light products of good quality, and to restrict the quantity of the light products, whereby the vapours and gases evolved are in a large measure dissolved in the treated residue, which is maintained as a fluid menstruum in which part of the carbon produced is carried away, while the carbon or carbonaceous matter deposited is relatively small in quantity, and is not deposited on the thermalizing tubes, where it would tend to choke the tubes and hinder the operation, rendering necessary unduly frequent stoppage for cleaning, but is exclusively deposited in the reactor under such conditions and in such a state as to be readily removed.

The invention has also for its purpose to control the application of heat to the liquid in the treatment, and to limit the extent of disruption to which the liquid is subjected, which is regarded as having a determined optimum temperature, at which disruption takes place to the extent required.

According to the invention the liquid after first being pre-heated to within a determined limit of the temperature of eventual cracking, that is to say to within for example not substantially less than about 25° of that temperature, is caused to flow upwardly in narrow streams at a relatively low velocity, while subject to heat uniformly and gradually applied, and thence to issue into the reactor. Thus heat is applied under conditions in which an accumulation of gas or vapour is avoided, and in which none of the liquid is heated appreciably above the temperature of the remainder, so that thus the cracking reaction is not liable prematurely to be propagated, or part of the liquid to be cracked within the thermalizing tubes, and thus a proportion of carbon or carbonaceous matter is not deposited on the thermalizing tubes.

According to the invention, moreover, heat is applied to the liquid while it passes directly upward in narrow streams into the reactor, so as to cause a rise of temperature substantially beyond the eventual mean temperature at which the cracking is effected within the reactor, that is to say by reason of the manner in which the heat is uniformly and gradually applied to the liquid in upwardly flowing streams, the interval between the acquisition of the cracking temperature and the consequent reaction is prolonged, and advantage is taken of this prolongation of the interval to raise the temperature of the liquid substantially beyond that at which cracking to the extent required may be effectively carried out within the reactor. Thus an impetus to disruption is thereby imparted and the completion of the reaction under substantially uniform temperature conditions is facilitated.

It has been found in general that in the use of a plurality of relatively short thermalizing tubes of small diameter, the upward streams of liquid may, under the conditions described, be heated to a final temperature on issuing into the reactor for example of about 20° above the determined mean temperature of cracking within the reactor, so that thus the temperature of the streams of liquid is above the mean temperature of eventual cracking for a substantial part of their course through the thermalizing tubes. Higher temperatures may, however, be employed in particular cases. For example it has been found in the treatment according to the invention of a shale oil of Scottish origin, of .865 gravity, that a final temperature of the oil on issuing into the reactor, of 40° in excess of the determined mean temperature of 380° C. within the reactor, did not result in any deposition of carbon or carbonaceous matter upon the thermalizing tubes. It will, however, be understood that in general the lower the determined temperature of cracking the longer the interval between the acquisition of that temperature and the actual decomposition, and the smaller also the yield. Thus when using the same apparatus for the treatment of various stocks having necessarily different determined temperatures of cracking but approximately the same time factor, the yield of the light products will vary by reason of the difference in the temperatures employed as well as by reason of the difference in the character of the stocks used. It is, however, possible to vary the time factor in the same apparatus by variation in the rate of flow of the oil stream, and where the final temperature within the thermalizing tubes is considerably higher than the determined temperature of cracking, it is possible for the rate of flow to be increased from the normal, to ensure that the oil is not prematurely decomposed within the thermalizing tubes, and in such a case use may be made of a second reactor into which the liquid may flow from the first, and by which the duration of the treatment therein may be extended, but in general various stocks may be treated according to the process in the same apparatus and without substantially varying the rate of flow through the thermalizing tubes.

It has been found that the process may be conveniently carried out under the conditions described in the use of a plurality of thermalizing tubes of ten feet in length and one and a half inches in diameter, but sets of tubes of varying length may be used which have so small a diameter or width of cross section, that when externally heated they have a very low cross-sectional temperature gradient. By such means in order to obtain particular final temperatures of the oil stream within the thermalizing tubes, the actual furnace temperature or the temperature of the heating gases may be very little higher. These conditions make for the avoidance of an excessive temperature of the oil, while the relatively short length of the thermalizing tubes permits of effective control of the heating gases in traversing them, and of the convenient use of a pyrometer for the indication of the temperature of the oil at a number of positions in its course through the tubes, so that thus the application of heat to the streams of oil may be indicated and determined with precision.

It has been determined that for each hydro-carbon oil that may be usefully treated according to the process of the invention, there is, within certain limits, a definite time-temperature ratio corresponding to determined yields of light spirit. The lower limit is specific for each oil, but in general is not lower than 350° C., nor higher than 400° C. It is lower for heavy oils such as asphaltic fuel oil residues, and higher for light oils such as gas oil or kerosene. For an average gas oil of Persian origin the lower temperature limit is about 380° C.

It is one of the objects of the invention to limit the yield of light products under the conditions indicated, and thus the temperature of cracking for ordinary stocks is determined at a moderate value within a range for example of 350° C. to 450° C. Thus the products of cracking within the reactor are as far as possible maintained dissolved in the liquid, and the total yield of light products and of unsaturated compounds limited under relatively low or moderate temperatures of cracking. Thus it will be understood that a predetermined restricted yield of the products of cracking is an important determining factor in the carrying out of the process under the conditions and for the purposes described, although the invention may be usefully employed in securing higher yields.

It will be understood that the capacity of the reactor is determined having regard to the rate of flow through the thermalizing tubes, and to the maintenance of the liquid in the reactor for such a length of time that the cracking to the extent required is completed. This in general is effected within a period of two hours, where the extent of the yield of light products is relatively low or moderate, and where the rate of flow through the thermalizing tubes of such dimensions as hereinbefore indicated, is about two feet per minute. It will be understood, however, that the time factor may to some extent be varied in the use of the same apparatus by variation in the rate of flow, and that the determined mean temperature of cracking may also be varied within restricted limits, while carrying out the process under the conditions and for the purposes described.

It will thus be understood that the process of the invention is advantageously carried out under such conditions as to produce a relatively small or moderate quantity of gasoline. For example in the treatment of heavy oils 10 to 15% of gasoline having an end boiling point of 175° C. may be produced under the conditions described, in addition to a proportionate amount of kerosene, and that such a pressure, for example from 350 to 450 lbs. per square inch, is maintained, that the gases and vapours are for the greater part kept dissolved in the oil, until the oil passes into the gas separator or cooler; while from other stocks higher yields may be secured, but substantially less than the yields possible in the employment of substantially higher temperatures and pressures than those contemplated in the carrying out of the invention.

The invention comprises the conditions of method hereinafter described.

Figures 2, 3:
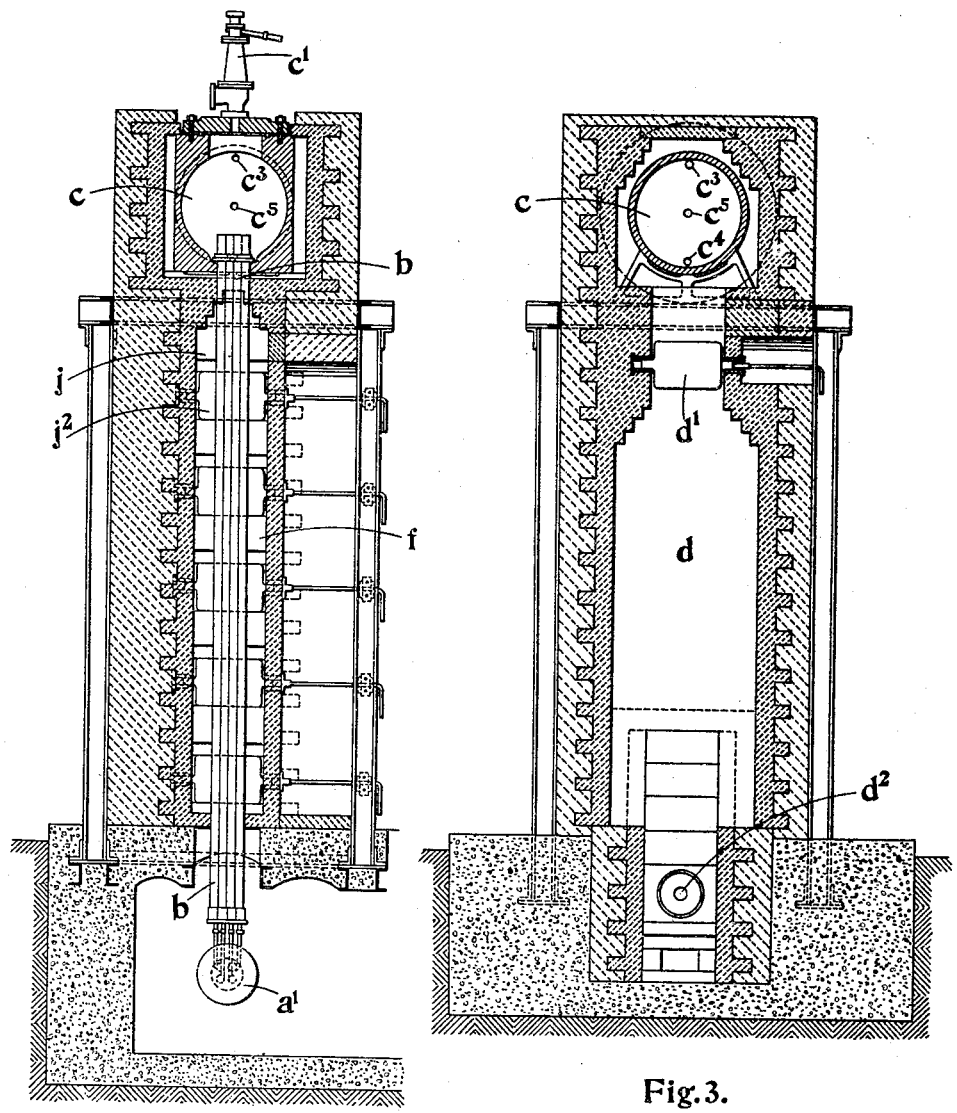

An apparatus such as may be used in carrying out the process of the invention is illustrated in the accompanying drawings, in which Figure 1 is a sectional elevation, and Figures 2 and 3 are sectional elevations on the lines 2—2 and 3—3 Figure 1.

In carrying the invention into effect, an apparatus may be employed such as described in the specification of a co-pending application, Serial No. 692,063, dated 11th February, 1924, comprising a pre-heater $a$, and a number of thermalizing tubes $b$ respectively mounted in vertical positions within adjacent and communicating vertical flues $f$, $g$, and a reactor $c$ surmounting the thermalizing tubes $b$ and to which the upper ends thereof are connected, so that the oil may successively pass through the pre-heater $a$ and thermalizing tubes $b$, and thence into the reactor $c$ for treatment according to the invention.

The pre-heater $a$ may be formed of a continuous tube of one inch internal diameter in a number of parallel vertically disposed lengths, and, at its lower end may be connected to a casing $a^1$ disposed beneath the flues, and into which the pre-heated oil may flow, and to which casing $a^1$ the lower ends of the thermalizing tubes $b$ are respectively connected. The thermalizing tubes $b$ may be four in number and of an internal diameter of one and a half inches, and they may be exposed to the heating gases which traverse them, for about ten feet of their length. At their upper ends they may be secured beneath and at the rear end of the reactor $c$, which is advantageously of cylindrical form, having for example a length of approximately eight and a half feet and a diameter of two and a half feet. The reactor $c$ is provided at its upper part with a safety valve $c^1$, and at the rear is closed, while at the front it may be open and have applied upon it a cover plate $c^2$, to which is secured the end of an outlet pipe $c^3$ which is accessible to the liquid in the upper part of the reactor $c$, and through which any vapour formed may thus pass outwardly with the liquid, and the outlet pipe $c^3$ may be provided with a suitable controlling valve. Thus the outlet pipe $c^3$ is situated in the uppermost part of the reactor $c$, so that any vapour and gas produced may pass out with the liquid. The reactor $c$ may be provided with an upward extension or dome, in a central or other position to which the outlet pipe $c^3$ may be secured, so as thus to ensure that any vapour and gas formed are always accessible to the outlet pipe $c^3$.

The reactor $c$ may conveniently be provided with an outlet pipe $c^4$ at the lowermost part of the reactor under the control of a valve, by which the accumulation of carbonaceous matter may be periodically withdrawn, while a supplementary outlet pipe $c^5$ also under the control of a valve may be provided in a middle position.

The reactor $c$ is so mounted in the setting that its upper part and sides may be heated by the heating gases, so that the temperature within the reactor may be maintained at the determined degree. The heating gases may pass upwardly from a vertical flue $d$ disposed near the front of the setting under the control of a pivoted valve or damper $d^1$, the heating gases passing from the upper end of this flue on each side of the reactor $c$ and thence passing towards its rear end and downwardly into the vertical flue $g$ in which the pre-heater $a$ is mounted.

The under-part of the reactor $c$ is provided with an insulation (not shown in the drawing) which may take the form of insulating brickwork interposed between the reactor and the setting, with a view to prevent or minimize the transmission of heat to the carbonaceous matter that in the treatment is slowly deposited on the lower part of the reactor, and thus to avoid the coking of this carbonaceous matter, that would otherwise result as a consequence of the application of heat to the lower part of the reactor.

Heat may be applied to the apparatus in the combustion of liquid fuel, and in the use of liquid fuel burners disposed at a position $d^2$ at the lower end of the front vertical flue $d$ above referred to, and the transverse wall $i$ on the inner side of the flue $d$ is constructed of open brickwork by which horizontal passages $i^1$ are provided through which the heating gases pass into a vertical flue $e$ upon its other side, while the setting may be so constructed that a transverse wall $j$ is formed between the transverse wall $i$, and the flue $f$, within which wall $j$ apertures $j^1$ are provided in which valves or dampers $j^2$ are pivotally mounted, by which the heating gases that pass across and up the flue $f$ in which the thermalizing tubes $b$ are set, may be regulated. A solid transverse wall $k$ may be provided in the setting in a position between the pre-heater $a$ and the thermalizing tubes $b$ to extend short of the top of the setting, so as to allow a passage $k^1$ through which the heating gases after passing upwards and across the thermalizing tubes $b$, may pass into the upper end of the vertical flue $g$ in which the pre-heater $a$ is mounted, and similarly a transverse wall $l$ may be provided and disposed in position on the other side of the pre-heater $a$, in which wall $l$ a number of apertures $l^1$ may be formed in which valves or dampers $l^2$ are pivotally mounted for regulating the passage of the heating gases into the adjacent vertically disposed outlet flue $h$.

It will be understood that the oil is fed to the pre-heater $a$ by a pump at a determined rate of feed, and that a pressure is thus maintained upon the oil in its course through the pre-heater $a$, thermalizing tubes $b$, reactor $c$ and cooler, which pressure rises to the substantially constant degree at which the treatment is to be carried out.

It will be understood that by the operation of the series of dampers $j^2$ first referred to, the application of heat to the thermalizing tubes $b$ is regulated, so that the oil in passing up the thermalizing tubes is gradually and uniformly heated, and thus the local over-heating of the tubes $b$ and the consequent premature decomposition of the oil is avoided.

The final temperature to which the oil is heated in its passage through the thermalizing tubes is so determined that the oil is uniformly heated substantially beyond the determined degree of eventual cracking within the reactor as hereinbefore described. Similarly heat is uniformly applied to the pre-heater to within for example not less than 25° C. of the determined temperature of cracking under conditions in which the over-heating of the oil within the pre-heater is also avoided.

It will be understood that inasmuch as the effective treatment according to the invention is dependent upon the precise determination of the conditions of temperature, a pyrometer is advantageously employed, whereby the temperature of the oil in a number of positions in the length of the thermalizing tubes is recorded, so that thus the application of heat and the temperature of the oil may be precisely indicated and determined. Similarly the temperature of the oil in a number of positions in the pre-heater may also be recorded for the same purpose.

In carrying out the treatment of a viscous asphaltic residue which has been treated in the apparatus hereinbefore described, the oil is pumped through the pre-heater and its temperature slowly raised to from 350° to 370° C., the oil thence flowing at a low or moderate velocity such as two feet per minute through the thermalizing tubes, wherein it is uniformly and gradually heated under precise temperature control in the manner described, to from about 400° to 410° C. under conditions in which substantially no cracking takes place, and the oil thence flows at approximately that temperature into the reactor, where the temperature of the oil tends to drop by reason of the endothermic character of some of the reactions involved. The temperature of the oil in the reactor it will be understood is, however, actually maintained for about two hours at or about the determined degree of 390° C. by the application of heat in the manner before described. The pressure in the treatment is maintained at from 350 to 450 lbs. per square inch, whereby the treatment is carried out substantially in the liquid phase, the small proportion of vapour and gas produced being withdrawn from the reactor with the liquid. By treatment under the conditions described 10% of gasoline of an end boiling point of 175° C. was produced together with a proportionate amount of kerosene. The residue after removing the light spirit has a viscosity of 340 seconds measured in the Redwood No. 2 viscometer at 30° F. The original oil had a viscosity of over 2000 seconds under the same conditions.

It will be understood that in the treatment the oil is continuously fed through the apparatus and continuously withdrawn from the reactor. The oil from the reactor may flow through a cooler and may thence be discharged through a release valve into a gas separator which may consist of a vertically disposed cylinder from which the gas and treated liquid may respectively be withdrawn.

It will be understood that the volatile liquid products are obtained partly by condensation from this separator and partly by dephlegmation of the resulting oil, and that the carbon is deposited in a loose condition on the walls of the reactor, which may be periodically cleaned.

In carrying out the treatment of a gas oil of Persian origin in the apparatus described, the determined temperature of cracking within the reactor was about 400° C., and the heat was gradually and uniformly imparted to the oil in its passage through the thermalizing tubes at from 420° to 430° C., the rate of flow of the oil through the thermalizing tubes and the duration of the treatment in the reactor, being the same as in the first example while the pressure was 430 lbs. per square inch. By the treatment under the conditions described 15% of gasoline was produced of an end boiling point of 175° C., together with a proportionate amount of kerosene.

In carrying out the treatment of a shale oil of Scottish origin and of .865 gravity in the apparatus described, the determined temperature of cracking within the reactor was 380° C., while the final temperature in the thermalizing tubes was about 410° C., the conditions otherwise being the same as in the second example, and the yield of gasoline of end boiling point of 175° C. being 17%.

In carrying out the treatment in the apparatus described of an especially heavy asphaltic base residue of Mexican origin of over .931 gravity, the determined temperature of cracking within the reactor was about 370° C., and the final temperature of the oil in the thermalizing tubes was 410° C. In this case the cracking temperature was maintained particularly low to avoid undue deposition of carbon in the reactor. The conditions were otherwise the same as in the first example and the yield of gasoline of end boiling point of 175° C. was 8 per cent.

It will be understood that the invention is not limited to a particular time factor nor to a particular rate of flow through the thermalizing tubes, nor yet is it limited to particular dimensions of the thermalizing tubes. A velocity of the oil through the thermalizing tubes of from one to three feet per minute has been found effective in carrying out the treatment under the conditions and for the purposes described, but no limitation is involved to this range of velocities.

It will furthermore be understood that when desired part of the condensed vapour produced in the treatment may be returned for treatment in the apparatus.

Any suitable means than hereinbefore described may be employed for applying heat to the thermalizing tubes in such manner as to ensure the gradual and uniform heating of the oil in its passage to the reactor.

We claim:

1. A pressure cracking process for liquid hydrocarbons, of the single pass type carried out substantially in the liquid phase, comprising the steps of pre-heating the liquid in a single stream to below a determined limit of the eventual temperature of cracking, then passing the liquid in narrow streams at low velocity in a direct and relatively short course into a reactor, subjecting the liquid in the narrow slowly moving streams having a very low cross-sectional temperature gradient to heat uniformly and gradually applied to a cracking temperature without causing the consummation of the cracking reaction, maintaining the liquid in the reactor to consummate the cracking reaction therein and withdrawing the treated liquid from the reactor, substantially as described.

2. A pressure cracking process for liquid hydrocarbons, of the single pass type carried out substantially in the liquid phase, comprising the steps of pre-heating the liquid in a single stream to below a determined limit of the eventual temperature of cracking, then passing the liquid at low velocity in a direct and relatively short course in narrow streams into a reactor, subjecting the liquid in the narrow slowly moving streams having a very low cross-sectional temperature gradient to heat uniformly and gradually applied, whereby for a substantial part of its course in the streams, the temperature of the liquid rises substantially beyond the eventual temperature of cracking within the reactor, and the interval between the acquisition of the cracking temperature in the slowly moving streams and the commencement of the consequent reaction is prolonged until the issue of the streams into the reactor and withdrawing the treated liquid from the reactor, substantially as hereinbefore described.

3. A process of the type described for cracking liquid hydrocarbons, of the single pass type carried out substantially in the liquid phase, comprising the steps of pre-heating the liquid in a single stream to below a determined limit of the eventual temperature of cracking, then passing the liquid in narrow streams at low velocity in a direct and relatively short course into a reactor, subjecting the liquid in the narrow slowly moving streams having a very low cross-sectional temperature gradient to heat uniformly and gradually applied and to a cracking temperature without causing the consummation of the cracking reaction and determining the conditions of operation for restricting the yield of light products of cracking that are withdrawn from the reactor and dissolved in the liquid, substantially as hereinbefore described.

4. A pressure cracking process for liquid hydrocarbons, of the single pass type carried out substantially in the liquid phase, comprising the steps of pre-heating the liquid in a single stream to below the determined limit of the eventual temperature of cracking, then passing the liquid in narrow streams at a velocity within the range of about from 1 to 3 feet per minute in a direct and relatively short course into a reactor, and subjecting the liquid in the narrow slowly moving streams having a very low cross-sectional temperature gradient to heat uniformly and gradually applied to a cracking temperature without causing the consummation of the cracking reaction, maintaining the liquid in the reactor to consummate the cracking reaction therein and withdrawing the treated liquid from the reactor, substantially as hereinbefore described.

SAMUEL JAMES MANSON AULD.
ALBERT ERNEST DUNSTAN.
PERCY HENRY HERRING.